United States Patent [19]

Delhay et al.

[11] Patent Number: 4,483,840

[45] Date of Patent: Nov. 20, 1984

[54] SYNTHETIC CARBONACEOUS GRANULES HAVING HIGH MECHANICAL CHARACTERISTICS

[75] Inventors: Jean-Paul Delhay, Villefontaines; Daniel Dumas, St. Priest; Paul Lacroix, Lyons, all of France

[73] Assignee: Societe des Electrodes et Refractaires, Paris, France

[21] Appl. No.: 551,568

[22] Filed: Nov. 14, 1983

Related U.S. Application Data

[63] Continuation of Ser. No. 352,999, Feb. 26, 1982, abandoned.

[30] Foreign Application Priority Data

Aug. 29, 1979 [FR] France ................................. 79 22253

[51] Int. Cl.³ ............................................ C01B 31/00
[52] U.S. Cl. ..................................... 423/445; 423/448; 423/449; 264/29.1; 264/29.3; 264/29.5; 264/29.7; 252/502; 252/510; 252/511
[58] Field of Search ....................... 423/445, 448, 449; 252/502, 510, 511; 264/29.1, 29.3, 29.5, 29.7

[56] References Cited

U.S. PATENT DOCUMENTS

| | | | |
|---|---|---|---|
| 1,317,498 | 9/1919 | Hinckley | 252/502 |
| 2,764,530 | 9/1956 | Klemgard | 252/510 |
| 2,799,053 | 7/1957 | Gartland | 423/448 |
| 4,219,405 | 8/1980 | PietzKa et al. | 423/449 |
| 4,265,710 | 5/1981 | Noguchi et al. | 423/448 |
| 4,308,073 | 12/1981 | Mills | 423/448 |

*Primary Examiner*—William R. Dixon, Jr.
*Assistant Examiner*—Margaret B. Medley
*Attorney, Agent, or Firm*—Dennison, Meserole, Pollack & Meserole

[57] ABSTRACT

The invention relates to synthetic carbonaceous granules having high mechanical characteristics and, more particularly, the granules produced from anthracite fines. The invention also relates to a process for the preparation of these granules.

These granules are produced by agglomeration of fines to the form of pellets, superficial pre-baking of these pellets by an oxidizing gas at a temperature of between 650° and 1000° C. for a few minutes, followed by calcination at a high temperature and, finally, by crushing permitting the desired granulometry to be obtained.

The synthetic carbonaceous granules, according to the invention, are used for all types of application and, in particular, for the manufacture of all types of carbonaceous paste, electrodes and carbonaceous blocks for the linings of furnaces or electrolysis cells.

7 Claims, No Drawings

SYNTHETIC CARBONACEOUS GRANULES HAVING HIGH MECHANICAL CHARACTERISTICS

This application is a division, of application Ser. No. 352,999, filed 2/26/82 now abandoned.

The invention relates to synthetic carbonaceous granules having improved mechanical characteristics, a process for manufacturing them and their use for the production of all types of carbonaceous products such as carbonaceous blocks, electrodes and carbonaceous pastes.

It is known that certain natural coals having a volatile material content below 20% by weight, and particularly natural anthracites have in granule form particularly high properties of mechanical strength which make them suitable for special use. These granules are, in particular, the basic constituent of the carbonaceous blocks used as lining for furnaces or electrolysis cells. They are also used for the manufacture of electrodes and also for the preparation of carbonaceous pastes.

To manufacture these various materials, the natural carbonaceous granules are firstly calcined at temperatures on the order of from about 1200° to 2400° C., then mixed in a suitable proportion with one or more carbonaceous or non-carbonaceous binders, such as pitches, tars, synthetic resins. The most valuable qualities of coal or anthracite are those which supply granules of great hardness and of great thermal stability after calcination.

Due to development of the uses of these natural carbonaceous granules having high characteristics and also to the exhaustion of certain mines, it is observed that the quantities available become insufficient and that the prices tend to increase. On the other hand, it is known that the extraction of these carbonaceous materials from underground as well as the crushing of the coarsest fractions are accompanied by the production of relatively large quantities of carbonaceous fines which are less than 2 mm in size and for which there is less use. For this reason, these fines are available at relatively low prices.

One of the conventional uses of these fines is for the manufacture of pellets which are agglomerated by compression with a binder which is usually a hydrocarbonaceous binder. These pellets are used mainly for domestic heating, a use which has decreased considerably in the last few years.

It has been proposed that the natural carbonaceous granules be replaced by synthetic granules obtained from fines after they have been agglomerated into pellets which are then calcined at a high temperature and subsequently crushed to produce granules of the desired granulometry.

Preliminary tests, carried out on some pellets obtained by mixing anthracite fines with a certain proportion of pitch or tar, have shown that it is not possible to obtain solid agglomerated products industrially by the convention method of high temperature calcination. If pellets having a relatively low binder content, that is to say containing from about 6 to 10% by weight, of pitch and/or tar, are calcined, it is observed that the pellets disintegrate gradually during their passage in the calcination furnace.

If the proportion of binder is increased to about 15%, the mechanical characteristics of the untreated pellets, as they leave the agglomeration presses, improve, but on attempting to calcine them in an electric furnace generally used for the continous calcination of granules of anthracite, it is observed that these pellets bond to each other and set in a mass. These furnaces comprise a vertical cylindrical shaft entirely filled up with the charge of anthracite granules which flows slowly and continuously within the shaft from top to bottom. The heating of the charge is carried out by means of an electric current which circulates through the charge. This electric current is supplied by electrodes in contact with the charge at the top and bottom of the furnace which are both connected to an outside electrical current source. The temperature of the charge is thus gradually brought to a maximum level comprised between 1200° and 2400° C. and between 1600° to 1700° C. in most cases.

The residence time inside the furnace lasts from about 10 to 20 hours.

To avoid the setting in a mass of pellets during the travel inside the furnace a pre-treatment of pellets of anthracite fines containing about 15% of binder in a rotary furnace at about 700° to 800° C. was tested, but it has not given better results. In fact, it has been observed that when these pre-treated pellets are calcined at more than 1300° C., they desintegrate in the same manner as the pellets having a low initial binder content.

A process has thus been investigated in which a suitable pre-treatment would permit the calcination of green pellets of anthracite and/or other natural coals, having a volatile material content lower than 20%, at temperatures of 1200° to 2400° C. without desintegration and without setting in a mass, the calcined pellets being then crushed synthetic granules of the desired granulometric composition.

The process according to the invention consists in the preparation of green pellets resulting of agglomeration of 90 to 50% by weight of fines of anthracite and/or of other coals having a volatile material content lower than 20% by weight with from 10 to 30% by weight of a binder based on pitch and/or tar, the green pellets being then submitted to the following double thermal treatment:

A first thermal treatment in which the green pellets are exposed during a period of time comprised between about 1 to 10 minutes to an oxidising gaseous atmosphere which has been brought to a temperature of from about 650° to 1000° C., that exposure causing a loss of about 4 to 6% of the initial weight of green pellets or up to about ⅓ of the volatile material content of the binder.

A second thermal treatment in which the pellet thus pre-treated are calcined at a temperature comprised between 1200° and 2400° C. Finally, the calcined pellets are crushed to obtain synthetic granules having high mechanical characteristics and the desired granulometric composition.

The testing of the pellets issued from the first thermal treatment has shown that, during the very short time of exposure of the green pellets to the high temperature oxidising atmosphere, a thin and hard layer of carbonaceous material has developed on the outer layer of each pellet. This layer permits to the pellets to be then calcined by means of an electric shaft furnace without disintegration. Further more, during the first thermal treatment, the part of the binder, contained within each pellet, which is located near the outer of the pellet loses it volatile material content thus avoiding the possibility for the pellets to bind to each other during the calcination.

It is observed also that during the first thermal treatment, the fraction of the binder which is volatilised burns at the outer layer of the pellets when it enters into contact with the high temperature oxidising atmosphere. Such a spontaneous combustion permits to increase the superficial temperature of the pellets very quickly having for result to form within an extremely short period of time a thin hard layer of carbonaceous material.

During the second thermal treatment inside the electric furnace, the pellets still containing at least ⅔ of the volatile matter contained in the binder will be slowly heated up to a temperature comprised between 1200° and 2400° and preferably of between about 1600° and 1700° C. It is observed that the pellets issued from this second treatment have been submitted to a shrinkage and have completely lost their content of volatile material.

The high mechanical characteristics of the granules obtained by crushing the pellets are essentially due to the simultaneous shrinkage of the binder and of the fines. During this shrinkage process, the thin hard layer developed during the first thermal treatment of the pellets preserves the integrity of each pellet.

The duration of the first thermal treatment depends on the size of each pellet. Tests have been carried out on egg shaped pellets having different weights comprised between 10 and 50 g. It results that, for pellets of about 10 g, a first thermal treatment of about 1 minute is enough while, for pellets of 50 g about 3 to 5 minutes of thermal treatment gives satisfactory results. Possibly larger pellets could be made for which a slightly longer thermal treatment up to about 10 minutes could be applied. The thickness of the hard layer formed around the pellets during this thermal treatment is related to its duration and also to the degree of temperature to which has been brought the oxidising atmosphere.

Practically, the duration of exposure is generally comprised between 1 and 5 minutes and for temperatures of oxidising atmosphere between 650° and 1000° C., the thickness of the hard layer obtained is comprised between about 0.5 and about 4 mm. The initial percentage of binder and the characteristics of the hydrocarbonaceous compounds it contains have also an action on the speed of formation of the hard layer. Simple practical tests enable to determine the best working conditions within these limits for a given type of pellet.

It is well known that natural anthracite granules are generally presenting a lamellar structure which becomes oriented during the production of carbon blocks or carbon electrodes, for instance by extrusion methods. Otherwise, the structure of the synthetic anthracite and/or coal granules obtained by crushing the pellets prepared according to this process is practically isotrope. The high mechanical characteristics of these granules result from that structure.

Using these isotrope synthetic granules, it is possible to obtain, by conventional methods carbon blocks and electrodes presenting improved physical properties as compared to those of natural anthracite and/or other coal granules.

The following example allows better understanding of an embodiment of the invention.

EXAMPLE

About one ton of anthracite fines originating from the La Mure mine (France) having a granulometry of less than 2 mm, 95% being less than 1 mm, are mixed at about 120° C. with 125 kg of coal pitch and 40 kg of coal tar, that is to say about 14% by weight of binder in the mixture. After mixing for about 20 minutes, the mixture is agglomerated by a press into pellets of about 30×40 mm at about 100° C. and an agglomeration pressure of about 30 MPa.

The pellets are then poured gradually onto a wire cloth conveyor belt so as to form a single layer without overlapping. This belt passes through a tunnel whose atmosphere is heated to about 800° C. by burners. The speed of travel of the belt inside the furnace is regulated so that the residence time of the pellets is about 2 minutes at a temperature >700° C. The composition of the furnace atmosphere is adjusted so that the gases in contact with the pellets have an oxidising composition.

At the outlet of the tunnel furnace, the pellets are introduced into a continous vertical electric furnace of the type used for the calcination of anthracite granules by the Joule effect through the charge. The average temperature attained by the pellets is from about 1600° to 1700° C., and the passage time through the furnace is about 15 hours.

After extraction of the calcined pellets, the pellets are crushed into granules of <20 mm.

These granules have been used for preparing a batch A of carbonaceous paste having the following composition:

1.5 to 15 mm granules: 37.5% by weight
granules smaller than 1 mm: 37.5% by weight
coal pitch: 25.0% by weight A batch B of carbonaceous paste having the same granulometry and the same composition by weight was prepared at the same time in which the granules used are natural anthracite granules also originating from the La Mure mine.

The two batches were mixed separately under identical conditions then each divided into three fraction labelled A1, A2, A3 and B1, B2, B3. This paste was put into the form of blocks of about 500×500×500 mm, which were then baked two at a time under identical conditions.

Blocks A1 and B1 were baked at 700° C.
Blocks A2 and B2 were baked at 1000° C.
Blocks A3 and B3 were baked at 1600° C.

Samples were then taken from each block and the following characteristics were measured. Tensile strength in MPa and electrical resistivity in $\mu$ohm/cm.

The following table shows the results obtained:

|  | Block baking temperature | BATCH A | BATCH B |
| --- | --- | --- | --- |
| Tensile strength in Mpa | 700° C. | A1: 1.9 | B1: 1.34 |
|  | 1000° C. | A2: 1.88 | B2: 1.14 |
|  | 1600° C. | A3: 1.78 | B3: 0.74 |
| Electrical resistivity in $\mu$ohm/cm | 700° C. | A1: 17,000 | B1: 19,300 |
|  | 1000° C. | A2: 7,510 | B2: 8,360 |
|  | 1600° C. | A3: 6,970 | B3: 8,160 |

These results show systematically the very clear superiority of the carbonaceous blocks produced with synthetic granules which are stronger mechanically and also better conductors of electricity.

The optimum content of hydrocarbonaceous binder for the production of the green pellets depends on the characteristics of the anthracite and/or coal fines used. It can vary from 10 to 30% by weight, but is preferably between 13 and 20% by weight.

Finally, numerous applications of these granules can be considered and especially their use for the production of any type of baked carbonaceous blocks for all types of uses such as linings for metallurgical and electrothermal furnaces, electrolysis cells, etc.

These granules can also be incorporated in carbonaceous pastes such as the pastes for Soderberg electrodes or those which are used for the production of refractory mortars for all types of lining.

Without departing from the scope of the invention, certain additional carbonaceous or non-carbonaceous components intended to modify certain characteristics of the products to be produced could be introduced into the mixture based on anthracite and/or coal fines and containing a hydrocarbonaceous binder. In particular, a certain proportion of coke fines such as, for example, petroleum coke fines can be introduced.

However, the mixture obtained should contain at least 50% by weight of fines of anthracite and/or other natural coals having a volatile material content below 20% by weight.

What is claimed is:

1. A process for the preparation of synthetic carbonaceous granules of improved strength and electrical conductivity from fines of natural carbonaceous materials having a volatile material content lower than 20% comprising the steps of:
   (a) forming pellets comprising from about 50 to about 90% by weight of natural carbonaceous materials having a granulometry of less than about 2 mm and from about 10 to about 30% by weight of a hydrocarbonaceous binder;
   (b) subjecting the green pellets to a first thermal treatment under conditions in which they are exposed as individual pellets to an oxidizing gaseous atmosphere from about 1 to about 10 minutes at a temperature of from about 650° to about 1000° C. to volatilize a portion of the binder in the outer layer of the pellets wherein a thin, hard layer of carbonaceous material develops at the outer layer of the pellets whereby the pellets can further be processed as a fluent mass;
   (c) calcining the pellets derived as in (b) as a fluent mass of individual pellets at a temperature between about 1200° and about 2400° C.; and
   (d) crushing the calcined pellets to obtain synthetic granules having a desired granulometric distribution.

2. A process according to claim 1 in which the first thermal threatment is carried out within a tunnel through which the pellets are transported on a belt, the tunnel containing an oxidizing atmosphere at a tempeature between 650° and 1000° C.

3. A process according to claim 1, in which at least about 80% of the fines have a granulometry of less than about 1 mm.

4. A process for the preparation of synthetic carbonaceous granules according to claim 1, wherein the fines to be treated are obtained from the group consisting of anthracite and natural coals having a volatile material content lower than 20%.

5. The process of claim 2 wherein the calcining of step (c) is carried forth in a continuous furnace.

6. The process of claim 5 wherein the continuous furnace utilized is a continuous electric furnace wherein heating to calcine is obtained by a Joule effect through the pellets.

7. A process according to claim 1 further including the step of utilizing the synthetic granules obtained in step (d) to form baked blocks having a tensile strength of at least 1.74 MPa.

* * * * *